(12) United States Patent
Kaikkonen et al.

(10) Patent No.: US 12,349,067 B2
(45) Date of Patent: Jul. 1, 2025

(54) METHOD FOR ENABLING SECONDARY CELL DORMANCY FOR USER EQUIPMENT POWER SAVINGS

(71) Applicant: Nokia Technologies Oy, Espoo (FI)

(72) Inventors: Jorma Johannes Kaikkonen, Oulu (FI); Jussi-Pekka Koskinen, Oulu (FI); Samuli Heikki Turtinen, Ii (FI); Timo Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 413 days.

(21) Appl. No.: 17/794,294

(22) PCT Filed: Jan. 25, 2021

(86) PCT No.: PCT/FI2021/050045
§ 371 (c)(1),
(2) Date: Jul. 21, 2022

(87) PCT Pub. No.: WO2021/160931
PCT Pub. Date: Aug. 19, 2021

(65) Prior Publication Data
US 2023/0060961 A1    Mar. 2, 2023

Related U.S. Application Data

(60) Provisional application No. 62/975,356, filed on Feb. 12, 2020.

(51) Int. Cl.
*H04W 52/02* (2009.01)
*H04W 76/28* (2018.01)

(52) U.S. Cl.
CPC ....... *H04W 52/0229* (2013.01); *H04W 76/28* (2018.02)

(58) Field of Classification Search
CPC ............ H04W 52/0229; H04W 76/28; H04W 52/0235; H04W 52/028; H04W 76/15;
(Continued)

(56) References Cited

U.S. PATENT DOCUMENTS

2019/0124558 A1    4/2019  Ang et al.
2019/0254110 A1    8/2019  He et al.
(Continued)

OTHER PUBLICATIONS

"New Wid: UE Power Saving in NR", 3GPP TSG RAN Meetings #84, RP-191607, Agenda: 9.4.6, CATT, Jun. 3-6, 2019, 5 pages.
(Continued)

*Primary Examiner* — Noel R Beharry
*Assistant Examiner* — Angelie T Ngo
(74) *Attorney, Agent, or Firm* — Robert P. Michal, Esq.; Carter, DeLuca & Farrell LLP

(57) ABSTRACT

The method includes receiving first configuration information from a network node, the first configuration information including information on a discontinue reception (DRX) cycle and a notification to monitor a physical downlink control channel (PDCCH) transmission carrying a wake-up indication, receiving second configuration information from the network node, the second configuration information including configuration information for secondary cells (SCells) that are associated with the network node, first determining an overlap occurrence using the DRX cycle, the overlap occurrence occurring due to one or more time occurrences overlapping with at least one first bandwidth part (BWP) active-time of an active bandwidth part (BWP) of the PDCCH, activating one more serving cells, following the determining of the overlap occurrence, and conducting an operation of data communications with the network node using the one or more serving cells that are activated. A network node is configured to perform the method.

1 Claim, 5 Drawing Sheets

(58) Field of Classification Search
CPC . H04W 52/0216; H04W 48/12; H04W 88/02; H04W 24/02; Y02D 30/70; H04L 5/001
See application file for complete search history.

(56) References Cited

U.S. PATENT DOCUMENTS

2021/0099954 A1* 4/2021 Agiwal ............. H04W 52/0229
2022/0264460 A1* 8/2022 Seo ................... H04W 72/0446

OTHER PUBLICATIONS

"Stage-2 running CR for support of UE Power Saving in NR", 3GPP TSG-RAN WG2 Meeting #109, R2-20xxxxx, CATT, Feb. 14-28, 2020, 24 pages.
"3rd Generation Partnership Project; Technical Specification Group Radio Access Network; NR; Physical layer procedures for control (Release 16)", 3GPP TS 38.213, V16.0.0, Dec. 2019, pp. 1-146.
International Search Report and Written Opinion received for corresponding Patent Cooperation Treaty Application No. PCT/FI2021/050045, dated Apr. 22, 2021, 16 pages.
"3rd Generation Partnership Project; Technical Specification Group Radio Access Network; NR; Medium Access Control (MAC) protocol specification (Release 15)", 3GPP TS 38.321, V15.8.0, Dec. 2019, pp. 1-78.
"RAN2 impact of WUS in connected mode", 3GPP TSG-RAN2 Meeting #108, R2-1915293, Agenda: 6.11.2, Ericsson, Nov. 18-22, 2019, pp. 1-3.
Extended European Search Report received for corresponding European Patent Application No. 21753451.0, dated Mar. 1, 2024, 9 pages.
"Summary of PDCCH-based Power Saving Signal/Channel", 3GPP TSG RAN WG1 Meeting #99, R1-1913433, Agenda item: 7.2.9.1, CATT, Nov. 18-22, 2019, pp. 1-38.
"On PDCCH-based power saving channel for UE power saving", 3GPP TSG RAN WG1 #99, R1-1912357, Agenda Item: 7.2.9.1, Sony, Nov. 18-22, 2019, 8 pages.

* cited by examiner

METHOD FOR ENABLING SECONDARY CELL DORMANCY FOR USER EQUIPMENT POWER SAVINGS

RELATED APPLICATION

This application was originally filed as PCT Application No. PCT/FI2021/050045 on Jan. 25, 2021, which claims priority from U.S. Provisional Application No. 62/975,356, filed on Feb. 12, 2020, each of which is incorporated herein by reference in its entirety.

BACKGROUND OF THE INVENTION

Field of Invention

One or more example embodiments relate to wireless communications networks.

Related Art

Fifth generation (5G) wireless communications networks are a next generation of mobile communications networks. Standards for 5G communications networks are currently being developed by the Third Generation Partnership Project (3GPP). These standards are known as 3GPP New Radio (NR) standards.

SUMMARY OF INVENTION

At least one first embodiment is directed toward a method.

In one example embodiment, the method includes receiving, by at least one processor of a user equipment (UE), first configuration information from a network node, the first configuration information including information on a discontinue reception (DRX) cycle and a notification to monitor a physical downlink control channel (PDCCH) transmission carrying a wake-up indication; receiving, by the at least one processor, second configuration information from the network node, the second configuration information including configuration information for secondary cells (SCells) that are associated with the network node; first determining, by the at least one processor, an overlap occurrence using the DRX cycle, the overlap occurrence occurring due to one or more time occurrences overlapping with at least one first bandwidth part (BWP) active-time of an active bandwidth part (BWP) of the PDCCH; activating, by the at least one processor, one or more serving cells, following the determining of the overlap occurrence; and conducting, by the at least one processor, an operation of data communications with the network node using the one or more serving cells that are activated.

In one example embodiment, each of the one or more serving cell is a primary cell (PCell), a primary secondary (PSCell) or a secondary cell (SCell).

In one example embodiment, the first determining further includes, second determining an on-duration of the DRX cycle coincides at least in part with the at least one first BWP active-time during the one or more time occurrences.

In one example embodiment, the method further includes third determining to cease monitoring of the active BWP during the one or more time occurrences.

In one example embodiment, the network node is one of a base station, a dedicated server, an as Evolved Node B (eNBs), a remote radio head (RRH), a 5G base station (gNBs), a femto base station or another network entity that is separate from the UE.

In one example embodiment, the second configuration information includes a rule set, the rule set notifying the UE which of the one or more serving cells is active.

In one example embodiment, the second configuration information includes a default set, the default set identifying the one or more serving cells for the UE.

In one example embodiment, the second configuration information includes identifying information, the identifying information including the identity of the one or more serving cells.

In one example embodiment, the first determining further includes, monitoring for the wake-up indication on the active BWP during at least one first BWP active-time.

In one example embodiment, the first determining further includes, fourth determining if the wake-up indication was received by the UE during the monitoring.

In one example embodiment, the one or more serving cells are one or more SCells, of the SCells, the activating including the UE commanding the one or more SCells to switch from a dormant state to a non-dormant state.

In one example embodiment, the wake-up indication is a DCP, the DCP being a notification for the UE to monitor the active BWP during at least one second BWP active-time, the DCP including downlink control information (DCI) with cyclic redundancy check (CRC) scrambled by power saving radio network temporary identity (PS-RNTI).

In one example embodiment, the active BWP is one singular active BWP of the PDCCH, and during the monitoring for the wake-up indication, the UE is not required to monitor an entire downlink frequency of the PDCCH.

At least another example embodiment is directed toward a network node.

In one example embodiment, the network node includes a memory containing computer-readable instructions; and at least one processor configured to read and execute the computer-readable instructions, in order to, receive first configuration information from a network node, the first configuration information including information on a discontinue reception (DRX) cycle and a notification to monitor a physical downlink control channel (PDCCH) transmission carrying a wake-up indication, receive second configuration information from the network node, the second configuration information including configuration information for secondary cells (SCells) that are associated with the network node, first determine an overlap occurrence using the DRX cycle, the overlap occurrence occurring due to one or more time occurrences overlapping with at least one first bandwidth part (BWP) active-time of an active bandwidth part (BWP) of the PDCCH, activate one or more serving cells, following the determining of the overlap occurrence, and conduct an operation of data communications with the network node using the one or more serving cells that are activated.

In one example embodiment, each of the one or more serving cell is a primary cell (PCell), a primary secondary (PSCell) or a secondary cell (SCell).

In one example embodiment, the at least one processor is configured to first determine by, second determining an on-duration of the DRX cycle coincides at least in part with the at least one first BWP active-time during the one or more time occurrences.

In one example embodiment, the at least one processor is further configured to third determine to cease monitoring of the active BWP during the one or more time occurrences.

In one example embodiment, the network node is one of a base station, a dedicated server, an as Evolved Node B (eNBs), a remote radio head (RRH), a 5G base station (gNBs), a femto base station or another network entity that is separate from the UE.

In one example embodiment, the wake-up indication is a DCP, the DCP being a notification for the UE to monitor the active BWP during at least one second BWP active-time, the DCP including downlink control information (DCI) with cyclic redundancy check (CRC) scrambled by power saving radio network temporary identity (PS-RNTI).

In one example embodiment, the active BWP is one singular active BWP of the PDCCH, and during the monitoring for the wake-up indication, the UE is not required to monitor an entire downlink frequency of the PDCCH.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

It should be understood that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

While one or more example embodiments may be described from the perspective of radio network elements (e.g., gNB), user equipment, or the like, it should be understood that one or more example embodiments discussed herein may be performed by the one or more processors (or processing circuitry) at the applicable device. For example, according to one or more example embodiments, at least one memory may include or store computer program code, and the at least one memory and the computer program code may be configured to, with at least one processor, cause a radio network element (or user equipment) to perform the operations discussed herein.

It will be appreciated that a number of example embodiments may be used in combination.

Figure 1:
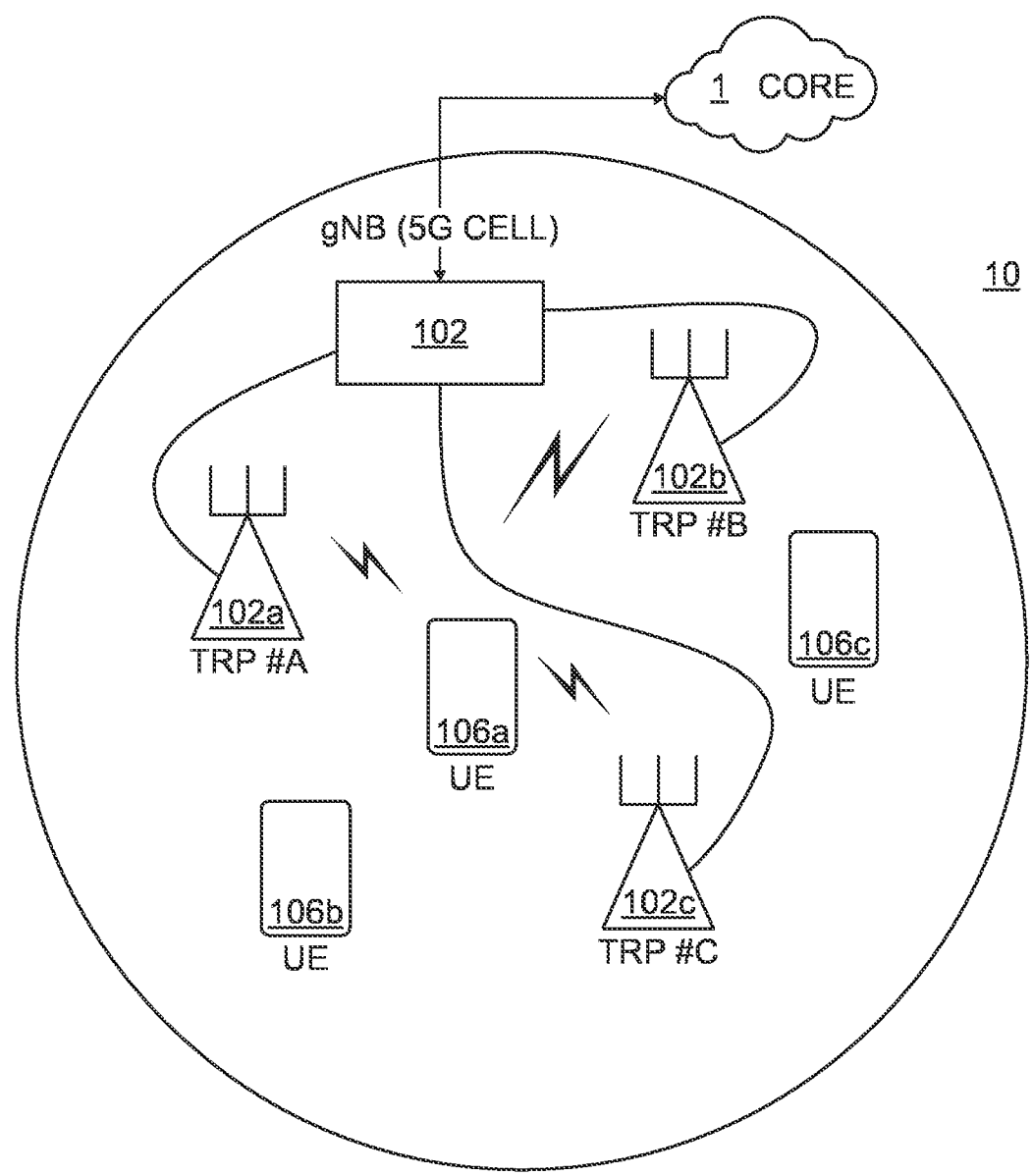
FIG. 1 illustrates a simplified diagram of a portion of a 3$^{rd}$ Generation Partnership Project (3GPP) New Radio (NR) access deployment for explaining example embodiments.

FIG. 1 illustrates a simplified diagram of a portion of a 3$^{rd}$ Generation Partnership Project (3GPP) New Radio (NR) access network 10 for explaining example embodiments. The 3GPP NR radio access deployment includes a base station (e.g., gNB 102) having transmission and reception points (TRPs) 102a, 102b, 102c. Each TRP 102a, 102b, 102c may be, for example, a remote radio head (RRH) or remote radio unit (RRU) including at least, for example, a radio frequency (RF) antenna (or antennas) or antenna panels, and a radio transceiver, for transmitting and receiving data within a geographical area. In an example embodiment, the TRP 102a, 102b, 102c can be considered secondary cells (SCells), from the standpoint the TRP 102a, 102b, 102c are smaller cells that communicate in conjunction with a larger cell (e.g., gNB 102). The TRPs 102a, 102b, 102c provide cellular resources for user equipment (UEs) 106a, 106b, 106c within a geographical coverage area. In some cases, baseband processing may be divided between the TRPs 102a, 102b, 102c and gNB 102 in a 5th Generation (5G) cell. Alternatively, the baseband processing may be performed at the gNB 102. In the example shown in FIG. 1, the TRPs 102a, 102b, 102c are configured to communicate with the UEs (e.g., UE 106a) via one or more transmit (TX)/receive (RX) beam pairs. The gNB 102 communicates with the network core 1, which is referred to as the New Core in 3GPP NR.

The TRPs 102a, 102b, 102c may have independent schedulers, or the gNB 102 may perform joint scheduling among the TRPs 102a, 102b, 102c.

It should be understood that the gNB 102 and TRPs 102a, 102b, 102c can provide communication services to a relatively large number of UEs 106a, 106b, 106c within the coverage area of the TRPs 102a, 102b, 102c. For the sake of clarity of example embodiments, communication services (including transmitting and receiving wireless signals) will be discussed primarily between the gNB 102, TRP 102a and/or the UE 106a, though it should be understood that signals may be transmitted between the gNB 102, any of the TRPs 102a, 102b, 102c, and any of the UEs 106a, 106b, 106c.

Figure 2:
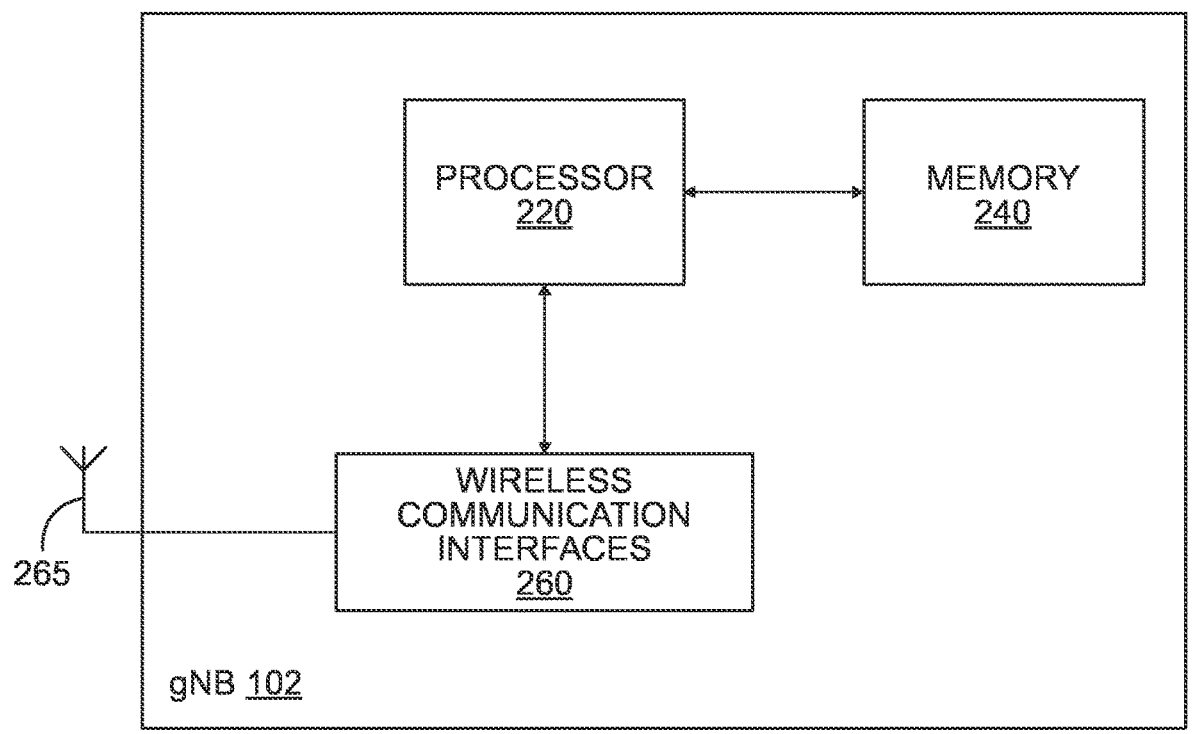
FIG. 2 illustrates a block diagram of a gNB, in accordance with an example embodiment.

FIG. 2 illustrates a block diagram of a gNB 102 (shown in FIG. 1), in accordance with an example embodiment. As shown, the gNB 102 includes: a memory 240; a processor 220 connected to the memory 240; various interfaces 260 connected to the processor 220; and one or more antennas or antenna panels 265 connected to the various interfaces 260. The various interfaces 260 and the antenna 265 may constitute a transceiver for transmitting/receiving data from/to the gNB 102 via a plurality of wireless beams or from/to the plurality of TRPs 102a, 102b, 102c, etc. As will be appreciated, depending on the implementation of the gNB 102, the gNB 102 may include many more components than those shown in FIG. 2. However, it is not necessary that all of these components be shown in order to disclose the illustrative example embodiment.

The memory 240 may be a computer readable storage medium that generally includes a random access memory (RAM), read only memory (ROM), and/or a permanent mass storage device, such as a disk drive. The memory 240 also stores an operating system and any other routines/modules/applications for providing the functionalities of the gNB 102 (e.g., functionalities of a gNB, methods according to the example embodiments, etc.) to be executed by the processor 220. These software components may also be loaded from a separate computer readable storage medium into the memory 240 using a drive mechanism (not shown). Such separate computer readable storage medium may include a disc, tape, DVD/CD-ROM drive, memory card, or other like computer readable storage medium (not shown). In some example embodiments, software components may be loaded into the memory 240 via one of the various interfaces 260, rather than via a computer readable storage medium.

The processor 220 may be configured to carry out instructions of a computer program by performing the arithmetical, logical, and input/output operations of the system. Instructions may be provided to the processor 220 by the memory 240.

The various interfaces 260 may include components that interface the processor 220 with the antenna 265, or other input/output components. As will be understood, the various interfaces 260 and programs stored in the memory 240 to set forth the special purpose functionalities of the gNB 102 will vary depending on the implementation of the gNB 102.

The interfaces 260 may also include one or more user input devices (e.g., a keyboard, a keypad, a mouse, or the like) and user output devices (e.g., a display, a speaker, or the like).

Although not specifically discussed herein, the configuration shown in FIG. 2 may be utilized to implement, inter alia, the TRPs 102a, 102b, 102c, other radio access and backhaul network elements and/or devices. In this regard, for example, the memory 240 may store an operating system and any other routines/modules/applications for providing the functionalities of the TRPs, etc. (e.g., functionalities of these elements, methods according to the example embodiments, etc.) to be executed by the processor 220.

Figure 3:
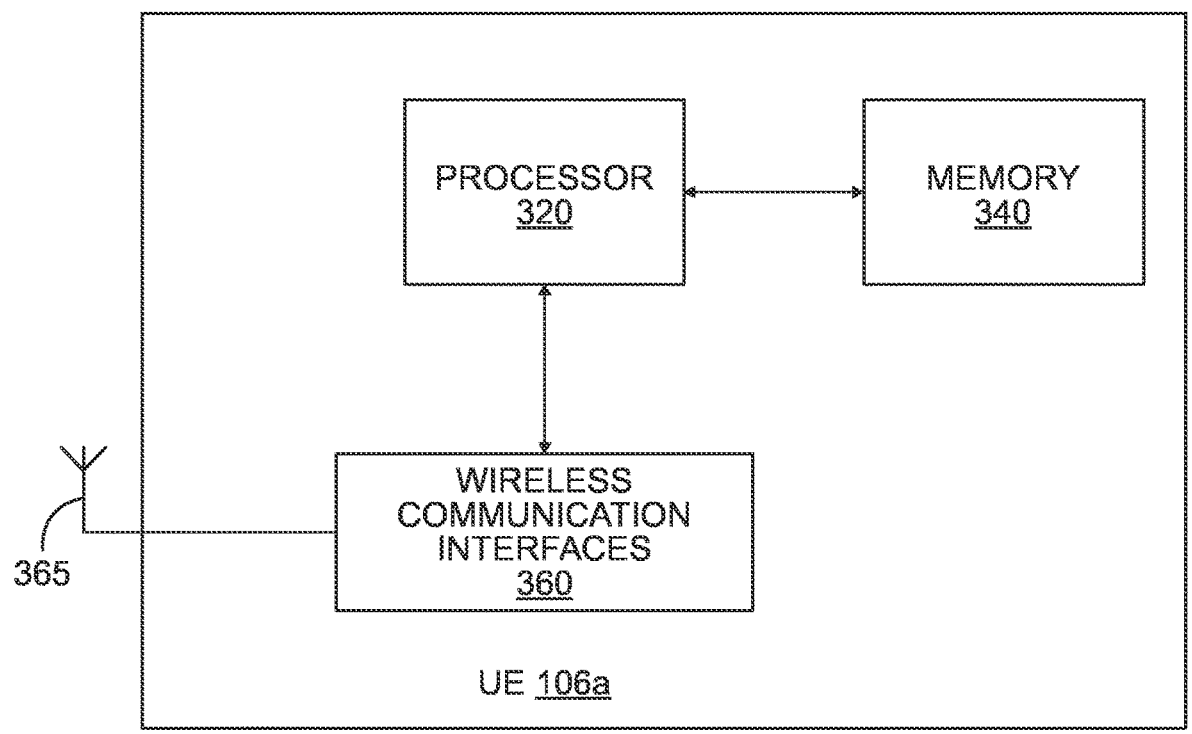
FIG. 3 illustrates a block diagram of a user equipment (UE), in accordance with an example embodiment.

FIG. 3 illustrates a block diagram of the user equipment (UE) 106a, in accordance with an example embodiment. It should be understood that the other UEs 106b, 106c have the same structure. The UE 106a is a device used by an end-user to communicate via the 3GPP NR radio access deployment shown in FIG. 1. Examples of UEs include cellular phones, smartphones, tablet, computers, laptop computers, or the like.

As shown, the UE 106a includes: a memory 340; a processor 320 connected to the memory 340; various interfaces 360 connected to the processor 320; and one or more antennas or antenna panels 365 connected to the various interfaces 360. The various interfaces 360 and the antenna 365 may constitute a transceiver for transmitting/receiving data to/from the gNB 102 via a plurality of wireless beams or to/from the plurality of TRPs 102a, 102b, 102c, etc. As will be appreciated, depending on the implementation of the UE 106a, the UE 106a may include many more components than those shown in FIG. 3. However, it is not necessary that all of these generally conventional components be shown in order to disclose the illustrative example embodiment.

The memory 340 may be a computer readable storage medium that generally includes a random access memory (RAM), read only memory (ROM), and/or a permanent mass storage device, such as a disk drive. The memory 340 also stores an operating system and any other routines/modules/applications for providing the functionalities of the UE 106a (e.g., functionalities of a UE, methods according to the example embodiments, etc.) to be executed by the processor 320. These software components may also be loaded from a separate computer readable storage medium into the memory 340 using a drive mechanism (not shown). Such separate computer readable storage medium may include a disc, tape, DVD/CD-ROM drive, memory card, or other like computer readable storage medium (not shown). In some example embodiments, software components may be loaded into the memory 340 via one of the various interfaces 360, rather than via a computer readable storage medium.

The processor 320 may be configured to carry out instructions of a computer program by performing the arithmetical, logical, and input/output operations of the system. Instructions may be provided to the processor 320 by the memory 340.

The various interfaces 360 may include components that interface the processor 320 with the antenna 365, or other input/output components. As will be understood, the various interfaces 360 and programs stored in the memory 340 to set forth the special purpose functionalities of the UE 106a will vary depending on the implementation of the UE 106a.

The interfaces 360 may also include one or more user input devices (e.g., a keyboard, a keypad, a mouse, or the like) and user output devices (e.g., a display, a speaker, or the like).

General Methodology

In an example embodiment, a wakeup signal (WUS) allows the UE 106a to skip physical downlink control channel (PDCCH) monitoring for a planned monitoring time period (an 'OnDurations' time period), when there is no data transmission to be transmitted. If the core 1 of the network (NW) 10 intends to schedule the UE 106a, the core 1 needs to send wake up signaling (WUS) to the UE 106a during a WUS occasion(s), to start the drx-onDurationTimer for the UE 106a. Once notified of the WUS occasion, via the WUS, the UE 106a will monitor a normal PDCCH for scheduling data during the coming OnDuration.

In 3GPP, the WUS is an indicator called (DCP) downlink control information (DCI) with cyclic redundancy check (CRC) scrambled by power saving radio network temporary identity (PS-RNTI). In alternative expression the WUS or DCP may be referred as physical downlink control channel (PDCCH) transmission carrying a wake-up indication. This wake-up indication may include indication for UE to determine whether to start (or not to start) drx-onDuration timer on the next occurrence of the timer and it may additionally include indication regarding SCell(s) and/or SCell group(s) dormancy state.

When DRX is configured, the terminal device does not have to continuously monitor PDCCH. DRX is characterized by the following:
 on-duration: duration that the UE waits for, after waking up, to receive PDCCHs. If the UE successfully decodes a PDCCH, the UE stays awake and starts the inactivity timer;
 inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e. not for retransmissions);

retransmission-timer: duration until a retransmission can be expected;

cycle: specifies the periodic repetition of the on-duration followed by a possible period of inactivity;

active-time: total duration that the UE monitors PDCCH. This includes the "on-duration" of the DRX cycle, the time UE is performing continuous reception while the inactivity timer has not expired, and the time when the UE is performing continuous reception while waiting for a retransmission opportunity.

In addition, the UE may be indicated, when configured accordingly, whether it is required to monitor or not the PDCCH during the next occurrence of the on-duration by a DCP received on the active BWP. By default, if it does not detect a DCP on the active BWP, the UE does not monitor the PDCCH during the next occurrence of the on-duration. However, it can also be configured to have the opposite behavior in this case, i.e. monitor the PDCCH during the next occurrence of the on-duration.

A UE can only be configured to monitor DCP when connected mode DRX is configured, and at occasion(s) at a configured offset before the on-duration. More than one monitoring occasion can be configured before the on-duration. The UE does not monitor DCP on occasions occurring during active-time, measurement gaps, or BWP switching, in which case it monitors the PDCCH during the next on-duration. If no DCP is configured in the active BWP, UE follows normal DRX operation.

Figure 4:
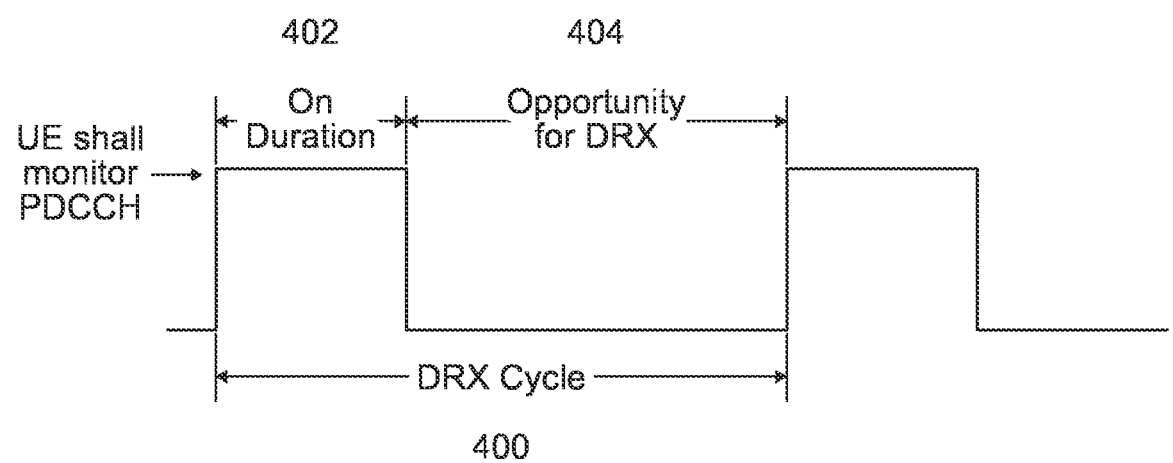
FIG. 4 illustrates a discontinue reception (DRX) cycle for the UE, in an example embodiment.

FIG. 4 illustrates a discontinue reception (DRX) cycle 400 for the UE 106a, in an example embodiment. The PDCCH monitoring occurs during these DRX cycles 400. Specifically, the PDCCH monitoring activity for the UE 106a a radio resource control (RRC) connected mode is governed by the DRX cycle 400, bandwidth adaptation (BA), and DCP.

In an example embodiment, when DRX cycle 400 is configured, the UE 106a does not have to continuously monitor PDCCH, and for this reason the UE 106a can save power consumption. The DRX cycle 400 is characterized by several elements, including: an on-duration time 402, an inactivity-timer, a retransmission-timer, and an active-time. The on-duration time 402 is a duration that the UE 106a waits for, after waking up, to receive PDCCHs for the UE 106a. If the UE 106a successfully decodes a PDCCH, the UE 106a stays awake and starts the inactivity-timer. In an example embodiment, the inactivity-timer is a timer that governs a duration in which the UE 106a waits to successfully decode a PDCCH, from the last successful decoding of a PDCCH, failing which the UE 106a will go back to sleep. The UE 106a shall restart the inactivity-timer following a single successful decoding of a PDCCH for a first transmission only (i.e. not for retransmissions). The retransmission-timer is a timer that governs a duration until a retransmission can be expected. The active-timer is a timer that governs a total duration that the UE 106a monitors PDCCH. This includes the "on-duration" 402 of the DRX cycle 400, the time the UE 106a is performing continuous reception while the inactivity-timer has not expired, and the time when the UE 106a is performing continuous reception while waiting for a retransmission opportunity. The DRX cycle 400 is the periodic repetition of the on-duration 402 followed by a possible period of inactivity 404.

In an example embodiment, the BA is configured so that the UE 106a only has to monitor PDCCH on one active bandwidth part (BWP). That is to say, the UE 106a does not have to monitor PDCCH on the entire downlink (DL) frequency of a cell. In an example embodiment, a BWP inactivity timer (independent from the DRX inactivity-timer described above) is used to switch the active BWP to the default one: the timer is restarted upon successful PDCCH decoding and the switch to the default BWP takes place when it expires. In 5G, a BWP is a contiguous set of physical resource blocks (PI s) on a given carrier.

In an example embodiment, the UE 106a is notified to monitor, or not monitor, the PDCCH during a next occurrence of the on-duration 402 by a DCP received on an active BWP. In an example embodiment, by default if the UE 106a does not detect a DCP on the active BWP, the UE 106a does not monitor the PDCCH during the next occurrence of the on-duration 402. However, in an example embodiment, the UE 106a can alternatively be configured to monitor the PDCCH during the next occurrence of the on-duration.

In an example embodiment, the UE 106a is configured to monitor DCP only when a connected mode DRX is configured, and at occasion(s) during a configured offset before the on-duration 402. In an example embodiment, more than one monitoring occasion can be configured before the on-duration. In an example embodiment, the UE 106a does not monitor DCP on occasions occurring during the active-time, measurement gaps, or BWP switching, in which case the UE 106a monitors the PDCCH during the next on-duration. It should be understood that the DCP is the wakeup indication that either starts, or does not start, the DRX "on Duration" timer in the UE 106a. In an example embodiment, if no DCP is configured in the active BWP, the UE 106a follows normal DRX operation.

In an example embodiment, when carrier aggregation (CA) is configured, DCP is only configured on the SpCell, where the SpCell refers to the Primary Cell (PCell) of the Master Cell Group (MCG) or the Primary Secondary Cell (PSCell) of the Secondary Cell Group (SCG).

In an example embodiment, one DCP is configured to control PDCCH monitoring during on-duration 402 for one or more UEs 106, independently.

In an example embodiment, power saving in a radio resource control idle mode (RRC_IDLE) and a radio resource control inactive mode (RRC_INACTIVE) can be achieved by the UE 106a relaxing neighbor cell radio resource measurements (RRM) when the UE 106a determines it is in a low mobility scenario, or the UE 106a is not at the cell edge.

In an example embodiment, the UE 106a power saving is enabled by adapting the DL maximum number of multiple input multiple output (MIMO) layers by BWP switching.

In an example embodiment, power saving is enabled during active-time via cross-slot scheduling, which facilitates the UE 106a to achieve power saving with the assumption that the UE 106a will not be scheduled to receive physical downlink shared channel (PDSCH), triggered to receive channel state information (A-CSI) or transmit a physical uplink control channel (PUSCH) scheduled by the PDCCH until a minimum scheduling offsets K0 and K2. In an example embodiment, dynamic adaptation of the minimum scheduling offsets K0 and K2 is controlled by PDCCH.

Dormant BWP for SCell:

In an example embodiment, "dormant" behavior involves multiple BWPs. In an example embodiment, for instance, dormant behavior includes at most one BWP that is a dormant BWP, and one BWP that is a non-dormant BWP (or a first BWP after dormancy or a BWP where UE switches from dormant BWP), or alternatively one BWP that is a dormant BWP and other BWPs that are regular BWPs. A dormant BWP is a BWP without PDCCH monitoring that has limited or no UL operation. In an example embodiment, the network core 1 can switch between dormant and non-dormant BWPs, using a "one-bit indication" (one-bit identifier, or indicator) or similar which can be transmitted during an active time, or outside of an active time (with slightly different signaling). In other words, in an example embodiment, when the network core 1 notifies the UE 106a to switch from dormant BWP to non-dormant BWP, by sending an indicator to the UE 106a, via the processor 220 of the gNB 102 sending the indicator to the UE 106a, the UE 106a switches to a first non-dormant BWP ID (for PDCCH monitoring) from a dormant BWP. The first non-dormant BWP ID can be different during an active time, as compared to during an active time.

Monitoring Dormancy/Non-Dormancy:

In an example embodiment, PDCCH monitoring and dormancy/non-dormancy behavior for SCells includes the following:

The UE 106a is configured with DRX mode operation, via the PCell, or via the SCell.

A location in the DCI format 2_6 of a wake-up indication bit is in the PSPositionDCI2-6, where:
 the UE 106a does not start the drx-onDurationTimer for the next long DRX cycle 400 when a value of the 'PDCCH monitoring' bit is '0', and
 the UE 106a starts the drx-onDurationTimer for a next long DRX cycle 400 when a value of the 'PDCCH monitoring' bit is '1.'

In an example embodiment, a bitmap when the UE 106a is provided a number of groups of configured Scells, by Scell-groups-for-dormancy-outside-active-time, occurs when:
 the bitmap location is immediately after the 'PDCCH monitoring' bit location
 the bitmap size is equal to the number of groups of configured SCells where each bit of the bitmap corresponds to a group of configured SCells from the number of groups of configured Scells
 a '0' value for a bit of the bitmap indicates an active DL BWP, provided by dormant-BWP, for the UE 106a for each activated SCell in the corresponding group of configured Scells, and
 a '1' value for a bit of the bitmap indicates an active DL BWP, provided by first-non-dormant-BWP-ID-for-DCI-outside-active-time, for the UE 106a for each activated SCell in the corresponding group of configured Scells.

The DCP is the wake up indication either starting or not starting the drx-onDurationTimer in the UE 106a, and the bitmap is the indication regarding dormancy state of group of configured SCells 102a, 102b, 102c upon start of the drx-onDurationTimer. The bitmap indication regarding the dormancy state may be configurable and may be configured when UE is configured with SCell dormancy.

In an example embodiment, the UE 106a can be configured for up to five groups of configured SCells 102a, 102b, 102c for dedicated dormancy behavior—where each group can consist of number of SCells (one or more). In one example, the UE 106a can also be configured with more than five groups.

Technical Problem Solved by Some Example Embodiments

If the DCP occasion or occasions overlap with the active time, the UE 106a will start drx-onDurationTimer at the next occasion as it cannot/may not be able to/is not required to decode the DCP. However, in an example embodiment, the processor 220 of the gNB 102 transmits a notification (via an indicator) to the UE 106a, to indicate a configuration for the SCell 102a, 102b, 102c dormancy when the drx-onDurationTimer is started on the next occasion of the timer, but the UE 106a cannot decode it. In an example embodiment, the processor 220 of the gNB 102 may not be aware, before building a DCP message (e.g., if the UE 106a transmitted a scheduling request, whether the UE 106a entered active time before the gNB 102 decoded such event). Said another way, when the processor 220 of the gNB 102 has determined that it shall transmit the DCP at a specific occasion, the processor 320 of the UE 106a may have already entered the UE 106a into a state (e.g., active time state) where the processor 320 of the UE 106a cannot receive the DCP, and thus the rule set of which SCells are active (when the processor 220 of the gNB 102 NW assumes and/or knows that UE 106a has not been able to receive the DCP) is defined for both the network 10 and the UE 106a to enable communication.

It would be possible to move all the SCells 102a, 102b, 102c into a non-dormant BWP (to non-dormant state) to ensure the network 10 can schedule from all the SCells 102a, 102b, 102c regardless of a possible miss of the DCP. However, doing so would require greater UE 106a power consumption, as the BWP would need to be changed from a dormant to a non-dormant state on at least a number of SCells.

Overview of Some Example Embodiments

In an example embodiment, upon determining DCP to overlap with active time (or, determine a measurement gap or BWP change or UE missing at least one/all occasions of DCP) by the UE 106a, which would prevent the UE 106a from conducting DCP monitoring, the BWP is activated (dormant BWP, non-dormant BWP, first active BWP, regular BWP) for one or more of the SCells 102a, 102b, 102c, or a group or groups of the SCells 102a, 102b, 102c, which can be based on a pre-defined condition(s). For example, the overlap or the overlap occurrence herein refers to a case where UE is not able to, has determined that it was not or will not be able to monitor DCP on one or more or all DCP occasions. As one example, when UE is on active time (i.e. monitoring PDCCH transmission with its own C-RNTI) it is not required to monitor DCP on the configured occasions and thus is not able to receive any wake-up indication to determine whether to start the drx-onDurationtimer on the next occurrence of the timer and would not be able to receive indication regarding SCell dormancy state (e.g. which SCells to switch from dormant to non-dormant state or which SCells keep on dormant state). Alternatively, an overlap occurrence may occur when UE is switching a BWP an is not able or it has missed one ore more DCP occasions on the BWP it switched to. Alternatively UE may need measurement gaps and during the measurement gap it may have limited capability to monitor PDCCH and when one or more DCP occasions overlap with the measurement gap, UE may determine that is was not able to receive/it has missed DCP occasion occasions. These are non-limiting examples.

In an example embodiment, the processor 220 of the gNB 102 configures the UE 106a with a default set, which the SCell(s)/group of SCell(s) should be switched to a non-dormant BWP. Additionally, within a group of SCells, the processor 220 of the gNB 102 can configure different behavior for each SCell 102a, 102b, 102c. In one example embodiment, the processor 220 of the gNB 102 configured each default group (one or more SCells) that are switched to non-dormant BWP. In one example, UE may switch non or all SCells in a SCell group to non-dormant BWP. In an example embodiment, the switching may be configured by one or more processors of servers, or entities, within the network 10, aside from the gNB 102.

In an example embodiment, a previously active BWP (dormant or non-dormant) on a SCell/group of SCells is not accounted in the default set. For example, the UE 106a may need to switch SCells from a previously on non-dormant BWP to a dormant BWP, and vice versa.

In an example embodiment, the UE 106a retains the active BWP on SCells that do not have dormant BWP, as the active BWP, regardless of the default set not requiring them to be on a non-dormant BWP. In one example embodiment, SCell or SCells that are not configured with dormant BWP, may be considered as default set and the default set is not considering the SCells with dormant BWP configured. In other words in one example, the default behavior is to consider all the SCells with dormant BWP configured to be on dormant state (i.e. switched to dormant BWP).

In an example embodiment, the UE 106a does not apply the default set, in case the active time prolongs over the next drx-onDurationTimer start. In this case, UE 106a may retain in non-dormant state/active the currently activated SCells.

In an example embodiment, the UE 106a switches to a non-dormant BWP on at least one SCell, of each configured group. In this example embodiment, at least one SCell is selected so that the selection is based on SCell index (serving cell index). In one example the SCell is selected so that it is the lowest (index) serving cell, the highest index serving cell, or if multiple is selected the selection starts from the lowest or the highest index of the configured cell group, or the selection is based on another network 10 configuration. In one example embodiment, the network 10 is configured to include one or more "default" SCells per group for default configuration. The default configuration may refer to a configuration where the network UE 106a determines, with SCell or SCells or SCell group that are switched from dormant BWP to non-dormant BWP, with or without additional indication. As an example, the network 10 may configure a default group of SCells, and when an SCell is part of the group, the SCell is determined to be switched by default to non-dormant state. In an alternative embodiment, the SCell may be specified/pre-configured that has a lowest or a highest group index/SCell index with a dormant BWP, which may be the default SCell/SCells. In an example embodiment, the configuration of the "default" SCells ensures that the network 10 does not need to update the configuration each time. Each time the network 10 configures a new SCell to a group, the processor 320 of the UE 106a determines whether the SCell is a default SCell (i.e., the SCell that is switched from dormant to non-dormant).

In an example embodiment, the UE 106a switches to non-dormant BWP on the SCells that are part of more than one group, if no such SCells are configured. In this example embodiment, the UE 106a may wake up, with the PCell only, and the SCells are kept dormant.

In an example embodiment, the UE 106a switches the SCells that are physical uplink control channel (PUCCH) SCells to non-dormant. Alternatively, the UE 106a switches to non-dormant on the SCells (or, all the SCell in the same group) that have PUCCH associated with the PCell.

In an example embodiment, the UE 106a retains the active BWP for each of the respective SCell/SCell groups, as the UE 106a is within the previous active time. In another example embodiment, the UE 106a switches to non-dormant the SCells of the previous group that were active and were used to schedule (where the UE 106a received/decoded PDCCH transmission addressed to its cell radio network temporary identifier, or C-RNTI).

In an example embodiment, the UE 106a switches to non-dormant on the SCells with carriers that are in-band with the PCell.

In an example embodiment, if the BWP of (certain) SCell(s) has changed from non-dormant to dormant due to timer (for instance, bwp-inactivityTimer), the UE 106a switches the active BWP of such SCell(s) to non-dormant.

In an example embodiment, the UE 106a monitors only PCell. In an example embodiment, the UE 106a monitors only PSCell. In an example embodiment, the UE 106a monitors only SpCell. In an example embodiment, the UE 106a at least monitors PCell or PSCell or SpCell.

In an example embodiment UE may determine to activate one or more serving cells wherein the serving cell may refer to PCell or PSCell or SpCell or to an SCell. Activating a cell may mean for SpCell (PCell or PSCell) that UE is starting the onDurationtimer on its next occasion (to e.g. monitor PDCCH) and for SCell configured with dormancy, switching the SCell to non-dormant BWP (e.g. for PDCCH monitoring) as described herein. In one example, in case of overlapping occurrence of DCP, UE may determine to activate/monitor only SpCell and not activate or monitor any SCells. In one example UE monitors at least SpCell and one or more SCells according to the embodiments of this invention.

In an example embodiment, the UE 106a retains the last applied SCell BWP state (dormant/non-dormant) during the 'dormancy transition timer' (or BWP-inactivity timer), and applies a configured default SCell BWP state after the timer has expired.

In an example embodiment, if the change of the BWP (non-dormant to dormant) for the SCell has occurred within or during the missed DCP monitoring, the UE 106a can prolong the 'dormancy transition timer' (or BWP-inactivity timer) so that SCells remain in non-dormant BWP upon the next onDuration when the UE 106a wakes-up. In this example embodiment, this could be achieved by stopping the timer when DCP cannot be decoded.

In an example embodiment, if the active time was exposed by the UE 106a initiated transmission (e.g., SR or Random Access), the UE 106a determines the dormancy state/BWP for each SCell/group of SCells based on whether the SCell is configured with UL carrier or whether the group of SCells is configured with SCell(s) with UL carrier(s).

In an example embodiment, the 106a UE switches the dormant BWP on SCells to non-dormant BWP based on a logical channel (LCH) mapping restriction configured on the SCells. In other words, based on the data the UE 106a has in its buffers (memory 340), the UE 106a at least switches the SCells to non-dormant BWP that can be used to transmit the data based on the configured LCH mapping restriction.

Figure 5:
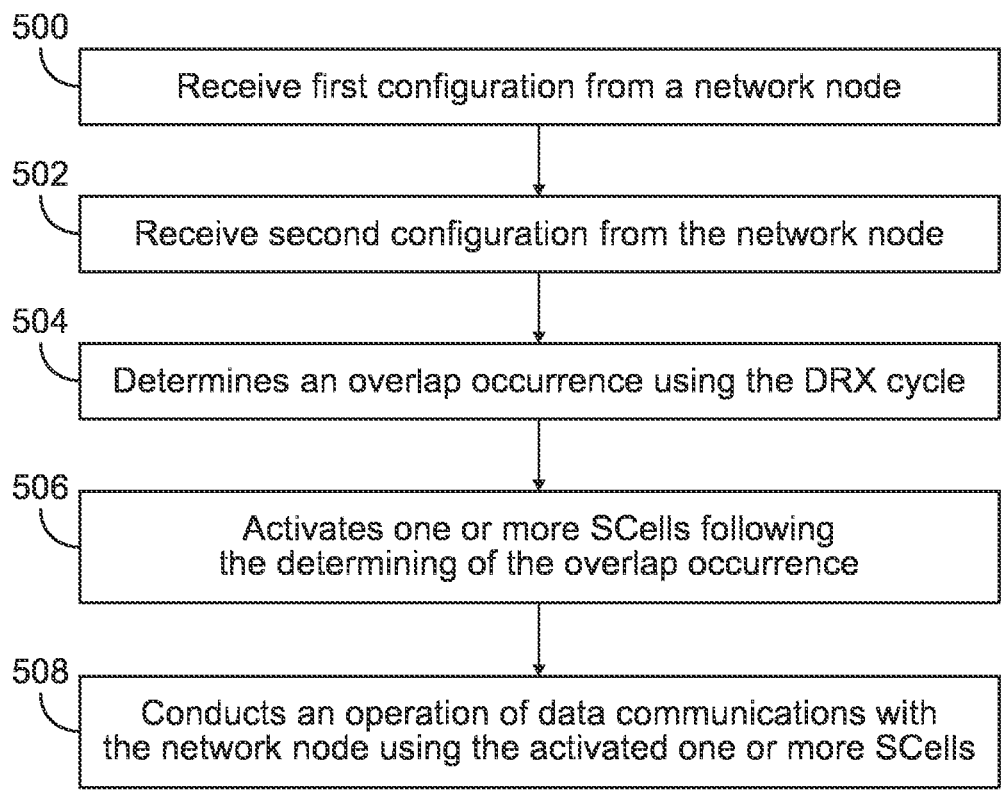
FIG. 5 illustrates a method of power saving for the UE, in an example embodiment.

FIG. 5 illustrates a method of power saving for the UE 106a, in an example embodiment. It should be understood that these steps are performed by the processor 320 of the UE 106a. In an example embodiment, in step S500, the processor 320 receives first configuration information from a network node, the first configuration information including information on the discontinue reception (DRX) cycle and a notification (indicator) to monitor for the downlink control information (DCI) with cyclic redundancy check (CRC) scrambled by power saving radio network temporary identity (PS-RNTI) (DCP) indicator. In an example embodiment, the network node can be an Evolved Node B (eNBs), a remote radio head (RRH), the gNBs, a femto base station, network controllers, a dedicated server, etc.

In an example embodiment, and in step S502, the processor 320 receives second configuration information from the network node, the second configuration information including configuration information for secondary cells (SCells) that are associated with the network node.

In an example embodiment, and in step S504, the processor 320 determines an overlap occurrence using the DRX cycle, the overlap occurrence occurring due to one or more time occurrences overlapping with at least one first bandwidth part (BWP) active-time of an active bandwidth part (BWP) of a physical downlink channel (PDCCH).

In an example embodiment, and in step S506, the processor 320 activates one or more SCells, of the SCells 102*a*, 102*b*, 102*c*, following the determining of the overlap occurrence.

In an example embodiment, and in step S508, the processor 320 conducts an operation of data communications with the network node using the activated one or more SCells. This operation can include, for instance, conducting data communications with the network node, conducting a random access channel (RACH) procedure, monitoring PDCCH etc.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," ect.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing user equipment, base stations, an as Evolved Node B (eNBs), a remote radio head (RRH), a 5G base station (gNBs), femto base stations, network controllers, computers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, user equipment, base stations, eNBs, RRHs, gNBs, femto base stations, network controllers, computers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A user equipment (UE) apparatus comprising: at least one processor;
and at least one memory storing instructions that, when executed by the at least one processor, cause the UE apparatus at least to:
receive first configuration information from a network node, the first configuration information including information on a discontinue reception (DRX) cycle and a notification to monitor a physical downlink control channel (PDCCH) transmission carrying a wake-up indication, wherein the network node is one of a base station or a remote radio head,
wherein the first configuration information includes a location in a Downlink Control Information (DCI) format 2-6 of a wake-up indication bit is in indicated by a PSPositionDCI2-6, where:
the UE apparatus does not start a drx-onDuration Timer for a next DRX cycle when a value of a 'PDCCH monitoring' bit is '0', and the UE apparatus starts a drx-onDuration Timer for a next DRX cycle when a value of the 'PDCCH monitoring' bit is '1';
receive second configuration information from the network node, the second configuration information including:
configuration information for secondary cells (SCells) that are associated with the network node, and
a rule set, the rule set notifying the UE apparatus of which of one or more serving cells is active based on the network node at least one of assuming or knowing that the UE apparatus has not been able to receive a downlink control information of power saving (DCP);
first determine an overlap occurrence using the DRX cycle, the overlap occurrence occurring due to one or more portions of the DRX cycle overlapping with at least one first bandwidth part (BWP) active-time of a BWP of the PDCCH, wherein the first determining further includes:
monitoring for the wake-up indication on the active BWP during at least one first BWP active-time, and
second determine an on-duration of the DRX cycle coincides at least in part with the at least one first BWP active-time during the one or more portions of the DRX cycle, wherein the active BWP is one singular active BWP of the PDCCH, wherein during the monitoring for the wake-up indication, the UB apparatus is not required to monitor an entire downlink frequency of the PDCCH, wherein the wake-up indication is the DCP, the DCP being a notification for the UE apparatus to monitor the active BWP during at least one second BWP active-time,
wherein the DCP includes downlink control information with cyclic redundancy check scrambled by power saving radio network temporary identity;
activate the one or more serving cells, following the determining of the overlap occurrence, wherein each of the one or more serving cells is an SCell, wherein the SCell of the one or more serving cells is selected so that the selection is based on a serving cell index, wherein the SCell is selected so that it is at least one of a lowest index serving cell, a highest index serving cell, or in a case where multiple are selected the selection starts from the lowest index or the highest index;
conduct an operation of data communications with the network node using the one or more serving cells that are activated, wherein the operation includes conducting a random access channel (RACH) procedure; and
third determine to cease monitoring of the active BWP during the one or more portions of the DRX cycle, wherein the activating including includes the UE apparatus commanding the one or more SCells to switch from a dormant state to a non-dormant state.

* * * * *